United States Patent [19]

Cochran et al.

[11] Patent Number: 5,364,150
[45] Date of Patent: Nov. 15, 1994

[54] TRUCK BEDLINER LOCKING DEVICE

[75] Inventors: James Cochran, Virginia Beach, Va.; Wayne Rollins, Greenville, N.C.

[73] Assignee: Atwell Industries, Inc., Ayden, N.C.

[21] Appl. No.: 54,212

[22] Filed: Apr. 30, 1993

[51] Int. Cl.$^5$ .............................................. B62D 33/02
[52] U.S. Cl. .................................. 296/39.2; 52/511; 411/549; 24/297
[58] Field of Search ................ 296/39.1, 39.2; 52/511; 411/349, 549, 553; 24/297

[56] References Cited

U.S. PATENT DOCUMENTS

| | | | |
|---|---|---|---|
| 1,360,880 | 11/1920 | Buchholtz | 411/349 X |
| 4,188,689 | 2/1980 | Patrin | 411/544 X |
| 4,657,462 | 4/1987 | Hoen | 411/349 X |
| 4,740,026 | 4/1988 | Wagner | 296/39.2 |
| 5,046,775 | 9/1991 | Marcum, Jr. et al. | 296/39.2 |
| 5,267,820 | 12/1993 | Sturtevant | 411/349 X |

FOREIGN PATENT DOCUMENTS

829128  2/1960  United Kingdom ............... 411/349

*Primary Examiner*—Dennis H. Pedder
*Attorney, Agent, or Firm*—Sughrue, Mion, Zinn, Macpeack & Seas

[57] ABSTRACT

A locking device is provided for securing a protective bedliner to the interior of a pick-up truck cargo bed wherein the cargo bed has side walls with inwardly extending horizontal flanges and vertically, downwardly extending flanges spaced from the side walls of the truck. The side walls of the bedliner are provided with a plurality of circular apertures overlapping the bottom edges of the vertical flanges and a locking device is associated with each aperture. Each locking device includes a base plate engageable with the wall of the bedliner around an aperture and a flat planar locking tongue extending perpendicular to the base plate through the aperture. The locking tongue includes a shank portion having first and second substantially parallel edges disposed substantially perpendicular to the base plate and a retainer portion extending laterally from the shank portion substantially parallel to the base plate. The locking tongue is inserted through the aperture in a substantially horizontal position until the base plate is seated against the bedliner wall. The locking device is rotated 90° to bring the retainer portion of the locking tongue into position on the opposite side of the vertical flange from the base plate to prevent movement of the bedliner relative to the flange of the truck bed wall. A screw is then inserted through the base plate into the bedliner wall to prevent further rotation of the locking device.

2 Claims, 2 Drawing Sheets

TRUCK BEDLINER LOCKING DEVICE

BACKGROUND OF THE INVENTION

The present invention is directed to a truck bedliner locking device and more specifically to a one piece rotatable member adapted to extend through a hole drilled through the liner in partial overlapping relation with the lower edge of the flange of the truck bed walls whereby upon rotation of the locking device, an angled projection thereon will move into locking engagement behind the truck bed flange.

Pick-up trucks are provided with an open top cargo bed having a bottom floor, opposite side walls and a front wall. The interior surfaces of the cargo bed are frequently subjected to damage due to objects being carried in the cargo bed. Once the paint finish on the interior surfaces of the cargo bed is scratched or otherwise penetrated, rusting of the sheet metal cargo bed begins. To prevent such damage, it has become common practice to utilize a liner of plastic material which is configured to have a bottom wall which overlies the bottom of the bed and front and side walls which extend upwardly adjacent the front and side walls of the cargo bed of the pick-up truck. Such a liner may be made of rubber-based materials or may be fabricated from synthetic resin or plastic materials which are molded into a configuration complementary to the cargo bed space for a particular model and make of truck.

Although the liners are configured to fit fairly closely to the contours of the cargo bed when molded to the specifications of a particular make and model truck, it is often necessary to provide some means for mechanically securing the liner in the cargo bed. Although many bedliners are provided with flanges designed to extend over the cargo bed rails along the top of the front and rear walls thereof, such flanges have not provided adequate securing of the liner to the cargo bed. Accordingly, a variety of mechanical devices have been provided for securing the bedliners to the cargo bed.

One type of fastener for securing a pick-up truck bedliner to the rail of the pick-up truck bed is generally classified as a snap-lock fastener. The U.S. patent to Edwards (U.S. Pat. No. 4,906,040) provides a plurality of slot pairs spaced around the top of the vertical walls of the liner at a level just below the interior flange of the truck bed walls. Resilient retainer clips extend through the slots and engage the flange of the truck bed walls to secure the liner to the bed.

Another type of snap-lock fastener for truck bedliners is shown in the U.S. Patent to Marcum (U.S. Pat. No. 5,046,775). The fastener includes a base plate which overlies the outer surface of a bedliner and a locking tongue projecting laterally from a bottom of the plate to extend through an aperture in the liner side wall to mechanically couple with the flange of the cargo bed sidewall to effect clamping of the liner to the flange. A similar snap-lock fastener is disclosed in the U.S. Patent to Kennedy (U.S. Pat. No. 5,150,940).

A different type of truck bedliner retainer is shown in the U.S. Patents to Gower (U.S. Pat. Nos. 4,659,133 and 4,768,822). In a first embodiment, each liner retaining device is comprised of a cup-shaped insertable portion having a substantially rectilinear box-like structure which is inserted through a corresponding aperture in the side wall of the pick-up truck bedliner immediately below the truck rail flange. A fastener is then inserted through the wall of the retainer behind the flange of the pick-up truck bed to secure the liner in position. In a second embodiment, a plurality of apertures are provided in the wall of the pick-up truck bedliner immediately below the flange of the pick-up truck bed. Retainers are rotatably mounted within the aperture with each retainer having a rim portion for engaging the liner and a conical-shaped insertable member that is spiralled in cross-section. The insertable member engages the ledge wall of the truck bed compartment in a screw-like manner to pull the rim against the liner and wedge the insertable portion against the ledge. Once the retainer is rotated into locking position, a screw may be inserted through the flange of the retainer and a wall of the liner to prevent further rotation of the retainer.

Other types of rotatable anchors for pick-up truck bedliners are disclosed in the U.S. Patent to Robinson et (U.S. Pat. No. 4,796,942) and Wagner (U.S. Pat. No. 4,740,026). The fastener of Robinson et al. is comprised of a rotatable bolt having a head at one end and an anchor member at the other end through which the bolt threadedly extends. The anchor member may be rotated in an aperture in the liner immediately below the flange of the pick-up truck bedliner until the anchor member engages the inner, upper surface of the rail, thereby preventing further rotation. Thus, upon continued rotation of the bolt, the anchor will be drawn against the flange to clamp the liner to the flange. In the Wagner device, the fixture includes a .lock member having a bevelled lower part which contacts a downturned inner portion of the truck bed side wall to secure the liner to the bed. An actuator pin allows the lock member to be rotated into a locked position after installation. Thus, both of these locking devices utilize a plurality of components.

The patents to Kawecki (U.S. Pat. No. 4,827,609), Olgren (U.S. Pat. No. 4,832,524) and Abe (U.S. Pat. No. 5,094,580) disclose various types of fasteners for other uses which may be rotated into locking position but require either a camming action or a plurality of components.

SUMMARY OF THE INVENTION

The present invention provides a new and improved locking device for truck bedliners which is easily inserted into a circular hole in the truck bedliner and easily rotated into a locking position with respect to the inturned flange of a truck bed rail without the need for substantial force as would be required for a snap-lock or cam-lock device.

The present invention provides a new and improved locking device for a truck bedliner comprising a substantially flat base plate having gripping means on one surface thereof and a substantially flat planar locking tongue secured to an opposite surface of said base plate at right angles thereto, said locking tongue having a first shank portion with substantially parallel opposite edges disposed substantially perpendicular to said base plate and a second retainer portion disposed at an end of said shank portion remote from said base plate and extending away from said first portion at substantially right angles thereto with an edge thereof opposed to said base plate disposed at an obtuse angle to the first edge of said shank portion and wherein said second edge of said shank portion is provided with a notch.

The present invention provides a new and improved locking device in combination with a truck bed compartment having a front wall and opposed side walls with the upper portion of the walls including an upper surface and a vertical downwardly extending flange and a protective liner within the truck bed compartment including a front wall and opposed side walls engaging said downwardly extending flange wherein a plurality of apertures are provided in the walls of said liner adjacent a bottom edge of said flange and a plurality of locking devices are secured in respective apertures and wherein each of said locking devices is comprised of a base plate adapted to engage the wall of said liner and a flat planar locking tongue connected to said base plate perpendicular thereto and extending through said aperture, said locking tongue having a first shank portion with a first upper edge and a second lower edge substantially parallel to each other and substantially perpendicular to said base plate and a second retainer portion extending laterally from said shank portion substantially parallel to said base plate with a surface thereof opposed to said base plate being disposed at an obtuse angle to said first edge of said shank portion and wherein said second edge has a notch therein whereby said locking device may be inserted through one of said holes in said wall of said liner with the retainer portion disposed substantially parallel to the top surface of said truck bed wall and rotated 90 degrees to locate said retainer portion behind said flange with said first edge of said shank portion engaging the lower edge of said flange to press the notch in said second edge of said shank portion over the wall of said liner.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
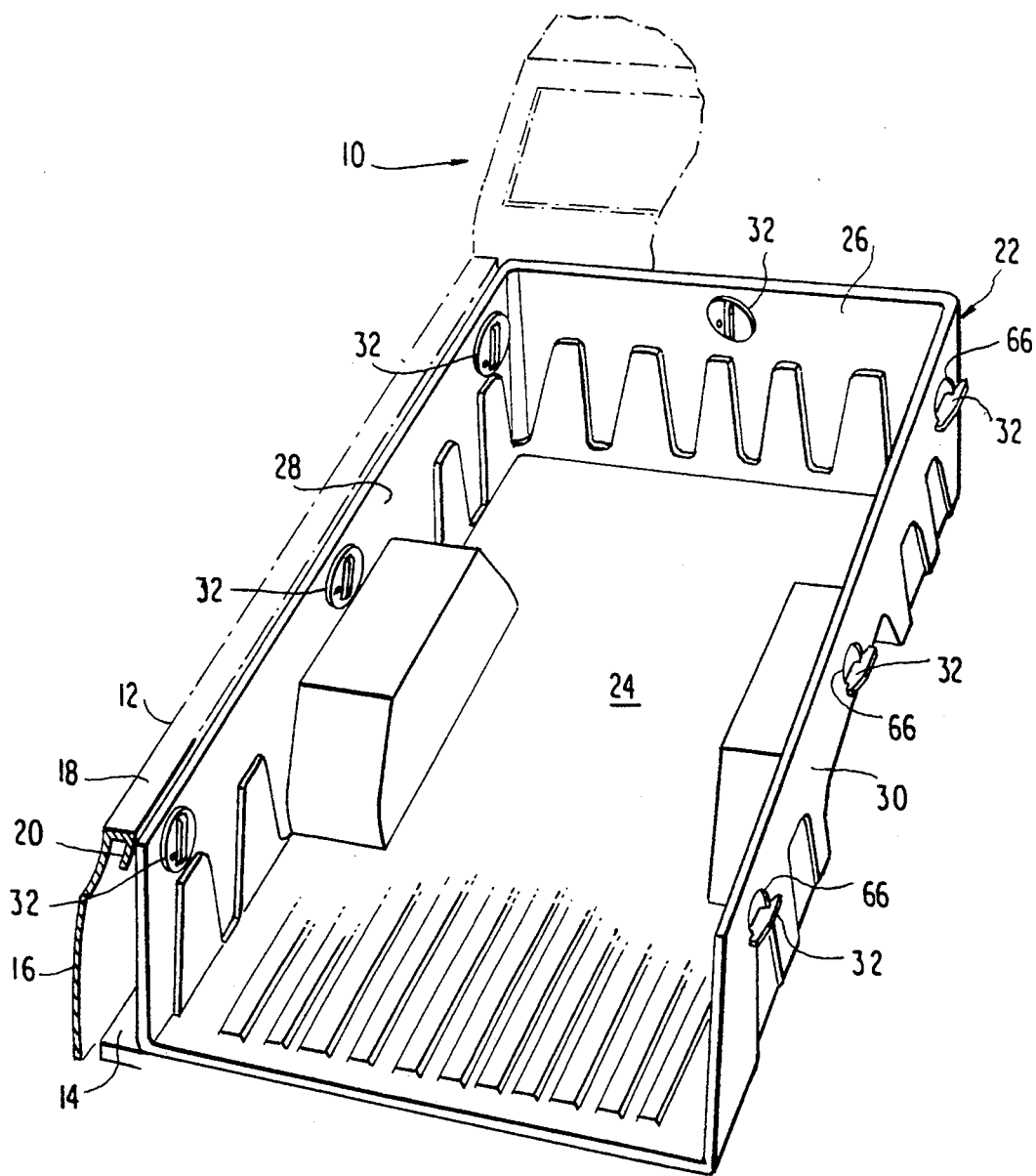
FIG. 1 is a perspective view of a truck bedliner secured in a truck bed with locking devices according to the present invention.
Figure 3:
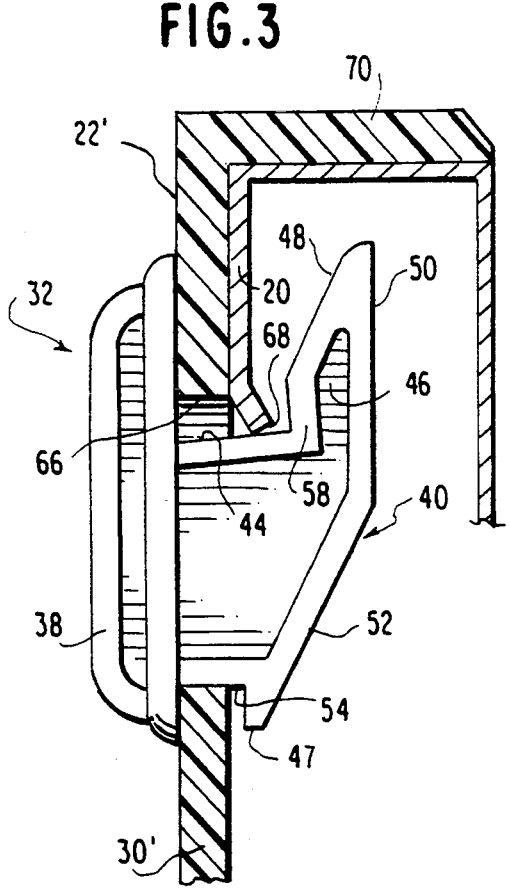
FIG. 3 is a side elevation view of the locking device of FIG. 1 in combination with the pick-up truck bed wall and bedliner wall with said pick-up truck bed wall and bedliner wall being sectioned.

A pick-up truck having a protective bedliner secured in the bed of the pick-up truck is shown in FIG. 1 with the right-hand portion of the truck broken away. The pick-up truck 10 as a conventional cargo bed 12 having a bottom wall 14, an upstanding front wall and opposed upstanding side walls 16 one of which is shown in FIG. 1. A suitable tailgate is conventionally provided for such a cargo bed. The side wall 16 has an inturned horizontally disposed flange 18 extending inwardly of the truck bed and terminating in a downwardly extending flange 20 as best seen in FIGS. 1 and 3.

The pick-up truck bedliner 22 is provided with a bottom wall 24, a front wall 26 and a pair of side walls 28 and 30. The configuration and dimensions of the truck bedliner correspond to those of the cargo bed. The upper edges of the walls of the bedliner are disposed in overlying relation with respect to the vertical flanges of the truck bed walls. The top edges of the walls of the bedliner 22 may terminate inside the truck bed adjacent the horizontal flanges 18 as shown in FIG. 1 or extend outwardly over the horizontal flanges 18 as shown in FIG. 3.

A plurality of locking devices are used to secure the pickup truck bedliner in the cargo bed of the pickup truck. As shown in FIG. 1, three locking devices 32 are provided for each side wall and a single locking device 32 is provided for the front wall. The exact number of locking devices may vary depending upon the size of the pickup truck bedliner. Since one side of the pickup truck bed has been broken away in FIG. 1, the locking portion of each locking device is visible where it extends through an aperture in the side wall 30 of the bedliner 22.

The details of the locking device are shown in FIGS. 2-5 inclusive. The locking device 32 is comprised of a substantially flat base plate 34 in the form of a circular disk. The peripheral edge of the base plate 34 is provided with a raised bead portion 36 on a first surface thereof to reinforce and stiffen the plate 34. A handle or gripping member 38 is also provided on the first surface of the base plate 34 to assist in the manipulation of the locking device. A substantially flat planar locking tongue 40 is secured to an opposite surface of the base plate at right angles thereto. The locking tongue 40 is provided with a shank portion 42 having substantially parallel opposite edges 44 and 47 which are also disposed substantially perpendicular to the base plate 34. The locking tongue 40 also includes a retainer portion 46 disposed at the end of the shank portion 42 remote from the base plate 34. The retainer portion 46 extends away from the shank portion 42 at substantially right angles thereto with an edge 48 thereof being disposed at an obtuse angle to the edge 44 of the shank portion. The opposite edge 50 of the retainer portion 46 extends substantially parallel to the base plate 34 while the end edge 52 of the shank portion 42 angles toward the base plate 34 to facilitate the insertion of the locking device through an aperture in the side wall of the liner bed. The edge 47 of the shank portion 42 is provided with a rectilinear notch 54 having a width slightly greater than the thickness of the bedliner.

To facilitate engagement of the locking tongue 40 with the vertical flange portion of the truck bed wall, as will be described hereinafter, the edge 44 of the shank portion 42 is disposed at an angle of 5° relative to a line perpendicular to the base plate 34. The inner portion 58 of the retainer portion 46 is then disposed at 90° to the edge 44.

Figure 4:
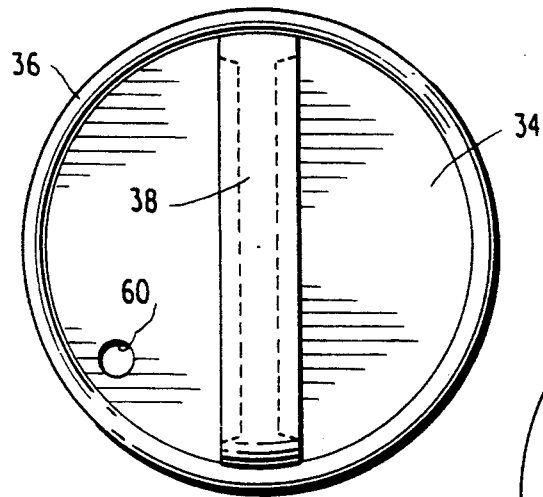
FIG. 4 is a front elevation view of the locking device.

The base plate 34 may be provided with an unthreaded screw aperture 60 as shown in FIG. 4 for receiving a retaining screw (not shown) as will be described hereinafter.

Figure 2:
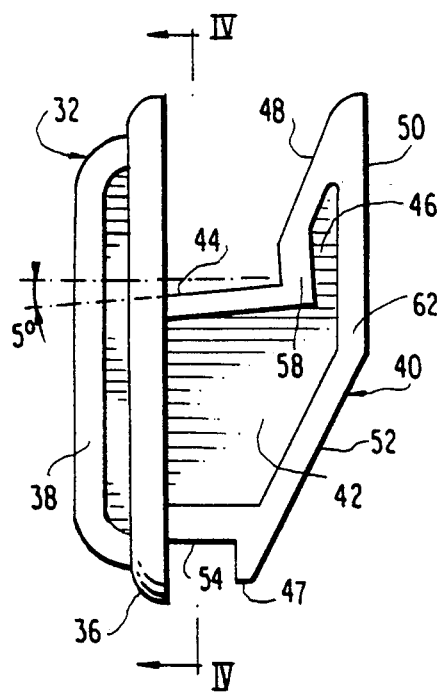
FIG. 2 is a side elevation view of a locking device according to the present invention.
Figure 5:
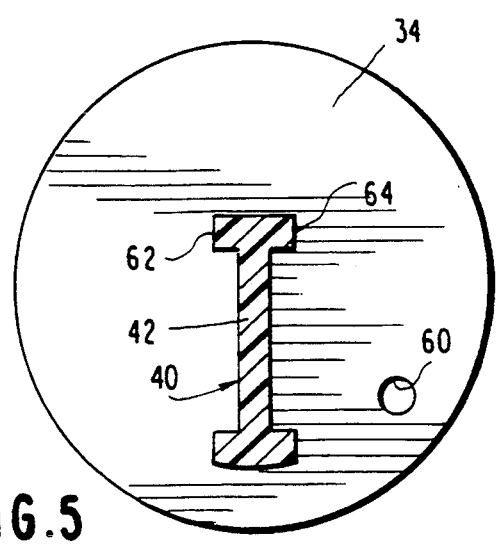
FIG. 5 is a sectional view taken along the line IV—IV in FIG. 2.

The planar locking tongue 40 is disposed in a diametrical plane of the circular base plate 34 as shown in FIG. 5. The mid point of the shank portion 42 as viewed in FIG. 5 is offset from the center of the circular base plate 34. The peripheral edges of the locking tongue 40 are provided with raised reinforcing bead like portions 62 and 64 as shown in FIGS. 2 and 5 to strengthen the locking tongue 40.

In order to secure the bedliner 22 to the walls of the cargo bed of the pick-up truck, a plurality of holes 66 are formed or cut in the side walls of the bedliner 22. With the bedliner 22 properly located within the truck bed, each hole 66 will be disposed substantially below the lower end 68 of the vertical flange of the side wall 16 of the truck bed as shown in FIG. 3 with a small portion of the hole 66 overlapping the vertical flange 20. Each hole 66 may be formed in the bedliner at the time of molding the bedliner but it is preferable to cut the holes 66 with a hole saw in order to more accurately locate the holes relative to the truck bed flange. The side wall 30 of the bedliner 22 in FIG. 1 is not provided with a lateral outwardly extending flange. However, the bedliner 22' as shown in FIG. 3 is provided with a lateral outwardly extending flange 70 which is adapted to rest on the upper surface of the horizontal flange 18 of the side wall 16 of the truck bed.

The holes 66 have a diameter slightly greater than the distance between the edges 44 and 47 of the shank portion 42 of the looking tongue 40 to allow for the passage of the locking tongue 40 through the hole 66. The locking tongue 40 is inserted through the hole 66 with the plane of the locking tongue 40 disposed substantially horizontally or parallel to the top edge of the bedliner wall as shown in FIG. 1. This allows the locking tongue 40 to be inserted through the hole 66 without any interference from the vertically extending flange 20 of the truck bed wall. Once the tongue 40 is fully inserted through the hole 66 and the flat locking plate 34 is disposed flush against the inner surface of the bedliner wall 30', the locking device is rotated 90° to position the retainer portion 46 of the locking tongue 40 behind the vertically extending flange 20. Upon rotation of the locking device, the edge 44 of the locking tongue 40 will engage the lowermost edge 68 of the flange 20 to push the entire locking device downwardly so that the notch 54 is received over the wall portion 30' of the bedliner. Thus, the bedliner will be firmly secured relative to the flange 20 of the pick-up truck bed wall. The locking device is easily inserted and rotated into locking position with minimal force since there is no snap action engagement of the locking device nor is there any camming action to clamp the wall of the bedliner to the flange of the pickup truck bed wall.

The exact shape and dimensions of the locking device may vary but should retain substantially the same overall configuration as shown in the drawings. The base plate may be oval shape or rectangular as long as the width of the oval or rectangle is at least as great as the oval 66 so as to cover the hole completely when the locking device is exposed in locking condition. The locking device is preferably made of fiberglass filled nylon material or the equivalent thereof and can be the same color as the material of the bedliner or may be a contrasting color for decorative purposes. Once the locking device is rotated into locking position as shown in FIG. 3, a screw may be inserted through the hole 66 in the base plate 34 and screwed directly into the wall of the bedliner to prevent further rotation of the locking device.

While the invention has been particularly shown and described in reference to the preferred embodiment thereof, it will be understood by those in the art that various changes in form and details may be made therein without departing from the spirit and scope of the invention.

What is claimed is:

1. The combination of a truck cargo bed having a base wall and at least one side wall terminating in an upper horizontally and inwardly extending flange having a downwardly extending vertical flange spaced inwardly from said side wall, a protective bedliner for said cargo bed having a configuration substantially complementary to said cargo bed, said bedliner having a vertically extending side wall disposed adjacent said cargo bed side wall with an upper marginal edge portion overlying said vertical flange in superimposed relation and at least one circular aperture extending through said bedliner side wall in partial overlapping relation with said vertical flange of said cargo bed and at least one locking device for mechanically securing said bedliner side wall to said cargo bed vertical flange wherein said locking device comprises a base plate having a base surface for engagement with an inner surface of said bedliner wall, a substantially flat planar locking tongue secured to said base surface of said base plate and extending substantially perpendicular thereto, said locking tongue having a shank portion with substantially parallel first and second opposite edges disposed substantially perpendicular to said base plate and a retainer portion disposed at an end of said shank portion remote from said base plate and extending away from said shank portion at substantially right angles thereto, said second edge of said shank portion having a notch therein adjacent said base surface and said aperture having a diameter slightly greater than a distance between said first and second edges to allow for the passage of the locking tongue through the aperture with the tongue disposed substantially parallel to a lower edge of said vertical flange, whereby upon rotation of the locking device 90° the first edge of said shank portion will engage said lower edge of said vertical flange to shift the locking device and engage a lower edge of the aperture in said notch and locate said retainer portion behind said vertical flange to secure the bedliner in said cargo bed.

2. The combination of claim 1, further comprising a plurality of apertures through said bedliner wall and a plurality of locking devices secured in said apertures, respectively.

* * * * *